US012803102B2

(12) United States Patent
Akiyama et al.

(10) Patent No.: US 12,803,102 B2
(45) Date of Patent: Nov. 17, 2026

(54) VEHICLE BATTERY PACK

(71) Applicant: SUBARU CORPORATION, Tokyo (JP)

(72) Inventors: Daichi Akiyama, Tokyo (JP); Meiko Ueyama, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 482 days.

(21) Appl. No.: 18/563,705

(22) PCT Filed: Aug. 26, 2022

(86) PCT No.: PCT/JP2022/032200

§ 371 (c)(1),
(2) Date: Nov. 22, 2023

(87) PCT Pub. No.: WO2024/042703

PCT Pub. Date: Feb. 29, 2024

(65) Prior Publication Data

US 2024/0304935 A1 Sep. 12, 2024

(51) Int. Cl.
*H01M 50/317* (2021.01)
*B60R 16/033* (2006.01)
(Continued)

(52) U.S. Cl.
CPC ......... *H01M 50/317* (2021.01); *B60R 16/033* (2013.01); *H01M 10/482* (2013.01);
(Continued)

(58) Field of Classification Search
CPC . H01M 50/317; H01M 10/613; H01M 10/625
See application file for complete search history.

(56) References Cited

U.S. PATENT DOCUMENTS 10,700,398 B2 6/2020 Kuboki et al.
11,569,554 B2 1/2023 Menargues Gomez et al.
(Continued)

FOREIGN PATENT DOCUMENTS

JP 2010-211963 A 9/2010
JP 2016-178078 A 10/2016
(Continued)

OTHER PUBLICATIONS

International Search Report Oct. 25, 2022 for International Patent Application No. PCT/JP2022/032200 (3 pages).
(Continued)

*Primary Examiner* — Olatunji A Godo
(74) *Attorney, Agent, or Firm* — Smith, Gambrell & Russell, LLP

(57) ABSTRACT

A vehicle battery pack included in a vehicle includes a battery module, vaporized gas release valves, a coupling duct, and a detection sensor. The battery module includes battery cells and partitions. The partitions are arranged between the battery cells in an arrangement direction of the battery cells, include a heat insulator, and are filled with a cooling solvent. The vaporized gas release valves operate by an increase in pressure associated with vaporization of the cooling solvent in the partitions and release a vaporized gas generated by the vaporization from the partitions. The coupling duct couples the vaporized gas release valves. The detection sensor detects a release of the vaporized gas through the vaporized gas release valves.

17 Claims, 7 Drawing Sheets

(51) Int. Cl.

| | |
|---|---|
| ***H01M 10/48*** | (2006.01) |
| ***H01M 10/613*** | (2014.01) |
| ***H01M 10/625*** | (2014.01) |
| ***H01M 10/647*** | (2014.01) |
| ***H01M 10/6567*** | (2014.01) |
| ***H01M 10/658*** | (2014.01) |
| ***H01M 50/209*** | (2021.01) |
| ***H01M 50/249*** | (2021.01) |
| ***H01M 50/358*** | (2021.01) |
| *B60L 50/64* | (2019.01) |

(52) U.S. Cl.

CPC ....... *H01M 10/613* (2015.04); *H01M 10/625* (2015.04); *H01M 10/647* (2015.04); *H01M 10/6567* (2015.04); *H01M 10/658* (2015.04); *H01M 50/209* (2021.01); *H01M 50/249* (2021.01); *H01M 50/358* (2021.01); *B60L 50/64* (2019.02); *H01M 2200/20* (2013.01); *H01M 2220/20* (2013.01)

(56) References Cited

U.S. PATENT DOCUMENTS

| | | | | |
|---|---|---|---|---|
| 2020/0058972 | A1 | 2/2020 | Kawai et al. | |
| 2021/0143492 | A1 * | 5/2021 | Zagrodnik .......... | H01M 50/249 |

FOREIGN PATENT DOCUMENTS

| | | | |
|---|---|---|---|
| JP | 2020-187941 | A | 11/2020 |
| JP | 2021-150033 | A | 9/2021 |
| WO | 2018/169044 | A1 | 9/2018 |

OTHER PUBLICATIONS

Written Opinion of the International Search Authority dated Oct. 25, 2022 for International Patent Application No. PCT/JP2022/032200 (5 pages).

* cited by examiner

VEHICLE BATTERY PACK

CROSS-REFERENCE TO RELATED APPLICATIONS

This application is the U.S. National Phase under 35 U.S.C. § 371 of International Application No. PCT/JP2022/032200, filed on Aug. 26, 2022.

TECHNICAL FIELD

The present invention relates to a technical field of a battery pack to be mounted on a vehicle.

BACKGROUND ART

For example, a battery (secondary battery) for supplying power to an electric motor is mounted on an electric vehicle, such as a hybrid automobile or an electric automobile, in which wheels can be driven by the power of the electric motor.

In general, discharge characteristics of a battery vary depending on temperature, and when the temperature of the battery is high, it is necessary to cool the battery.

In the cooling of the battery, it is preferable that heat be easily transferred between battery cells. Thus, when a battery cell is locally high in temperature, the heat is transferred to surrounding battery cells and a cooling medium to cool the battery cell.

As such a battery pack, there is known a battery pack in which heat transfer between the battery cells is facilitated in a normal state and heat transfer between the battery cells is suppressed at the time of thermal runaway of the battery pack (PTL 1 below).

CITATION LIST

Patent Literature

PTL 1: International Publication No. 2018/169044

SUMMARY OF INVENTION

Technical Problem

The occurrence of thermal runaway of a battery cell is to be detected. The appropriate and early detection of the thermal runaway enables, for example, the vehicle to move to a safe place and the occupants to quickly evacuate.

Therefore, the present invention has been made in view of such a problem, and an object of the present invention is to propose a vehicle battery pack having a configuration capable of detecting thermal runaway while considering both cooling efficiency and thermal insulation of battery cells.

Solution to Problem

A vehicle battery pack according to the present invention includes a battery module, vaporized gas release valves, a coupling duct, and a detection sensor. The battery module includes battery cells and partitions. The partitions are arranged between the battery cells in an arrangement direction of the battery cells, include a heat insulator, and are filled with a cooling solvent. The vaporized gas release valves operate by an increase in pressure associated with vaporization of the cooling solvent in the partitions and release a vaporized gas generated by the vaporization from the partitions. The coupling duct couples the vaporized gas release valves. The detection sensor detects a release of the vaporized gas through the vaporized gas release valves.

Thus, while the cooling solvent is present as a liquid in the partition, heat is efficiently transferred between two adjacent battery cells via the partition. In addition, when thermal runaway occurs in the battery cell, the cooling solvent is vaporized due to an increase in the temperature of the battery cell and is released to the outside from the partition. As a result, the two battery cells are adjacent to each other with the heat insulator and the vaporized gas interposed therebetween, thereby significantly reducing thermal conductivity between the battery cells.

In addition, by measuring the pressure in the coupling duct based on a sensor value of the detection sensor such as a pressure sensor, the generation of the vaporized gas generated by the vaporization of the cooling solvent can be detected.

Advantageous Effects of Invention

According to the present invention, it is possible to propose a vehicle battery pack having a configuration capable of detecting thermal runaway while considering both the cooling efficiency and thermal insulation of battery cells.

DESCRIPTION OF EMBODIMENTS

An embodiment of a vehicle battery pack 1 of the present invention will be described below with reference to the accompanying drawings.

1. Configuration of Vehicle Battery Pack

Figure 1:
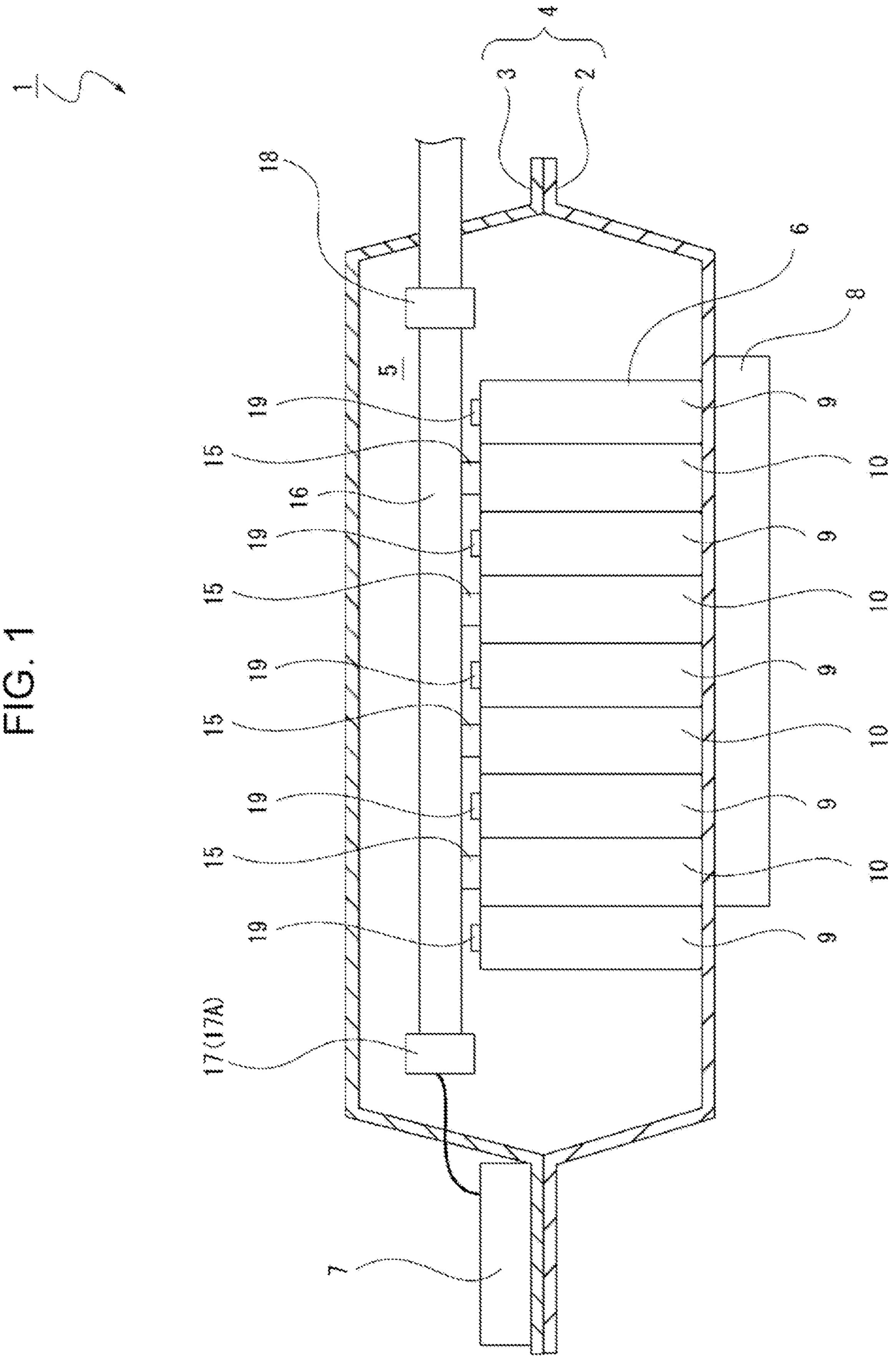
FIG. 1 is a schematic cross-sectional view illustrating a configuration example of a vehicle battery pack according to an embodiment of the invention.

FIG. 1 illustrates a configuration example of the vehicle battery pack 1 according to the present invention.

The vehicle battery pack 1 includes a case unit 4, one or more battery modules 6, a battery electronic control unit (ECU) 7, and a cooler 8. The case unit 4 includes a lower case 2 and an upper case 3. The one or more battery modules 6 are disposed in an internal space 5 formed by the case unit 4. The battery ECU 7 monitors input and output of the battery module 6, cools the battery module 6, or acquires various sensor values such as voltage, current, and pressure. The cooler 8 cools the battery module 6.

The lower case 2 is formed in a box shape which is open upward. The upper case 3 is attached so as to close the opening of the lower case 2 from above, and thereby the internal space 5 is formed as a sealed space.

The battery module 6 includes battery cells 9 and partitions 10 arranged between the battery cells 9.

The battery cells 9 and the partitions 10 are each formed in a flat cubic shape, and are alternately arranged adjacent to each other in the thickness direction. A direction in which the battery cell 9 and the partition 10 are adjacent to each other is, for example, a vehicle front-rear direction, and is referred to as an "arrangement direction" in the following description.

The inside of the partitions 10 is filled with a cooling solvent so that the partitions 10 can efficiently exchange heat with the battery cells 9.

Each of the partitions 10 illustrated in FIG. 1 is adjacent to two battery cells 9. Each of the two battery cells 9 adjacent to each other with the partition 10 interposed therebetween can exchange heat with the partition 10, so that the battery cells 9 can indirectly exchange heat with each other. Thus, when one battery cell 9 reaches a high temperature, heat can be released to the adjacent battery cell 9 via the adjacent partition 10.

The partition 10 plays a role of dispersing heat locally generated in the battery cell 9 by heat exchange between the battery cell 9 and the cooling solvent in the normal state. However, when thermal runaway occurs, the cooling solvent evaporates to replace the space filled with the cooling solvent with gas, thereby significantly reducing the efficiency of heat exchange with the battery cell 9.

Thus, the partition 10 promotes heat exchange with the battery cell 9 in the normal state, and suppresses heat exchange with the battery cell 9 when thermal runaway occurs.

It is desirable that the cooling solvent be appropriately selected in accordance with the material of each member constituting the vehicle battery pack 1. For example, when a material that melts at 100 °C. is employed as the material constituting the vehicle battery pack 1, it is desirable to select a cooling solvent that evaporates at less than 100 °C. As a result, it is possible to prevent the occurrence of an electrical short circuit or the spread of fire due to melting of the material.

Figure 2:
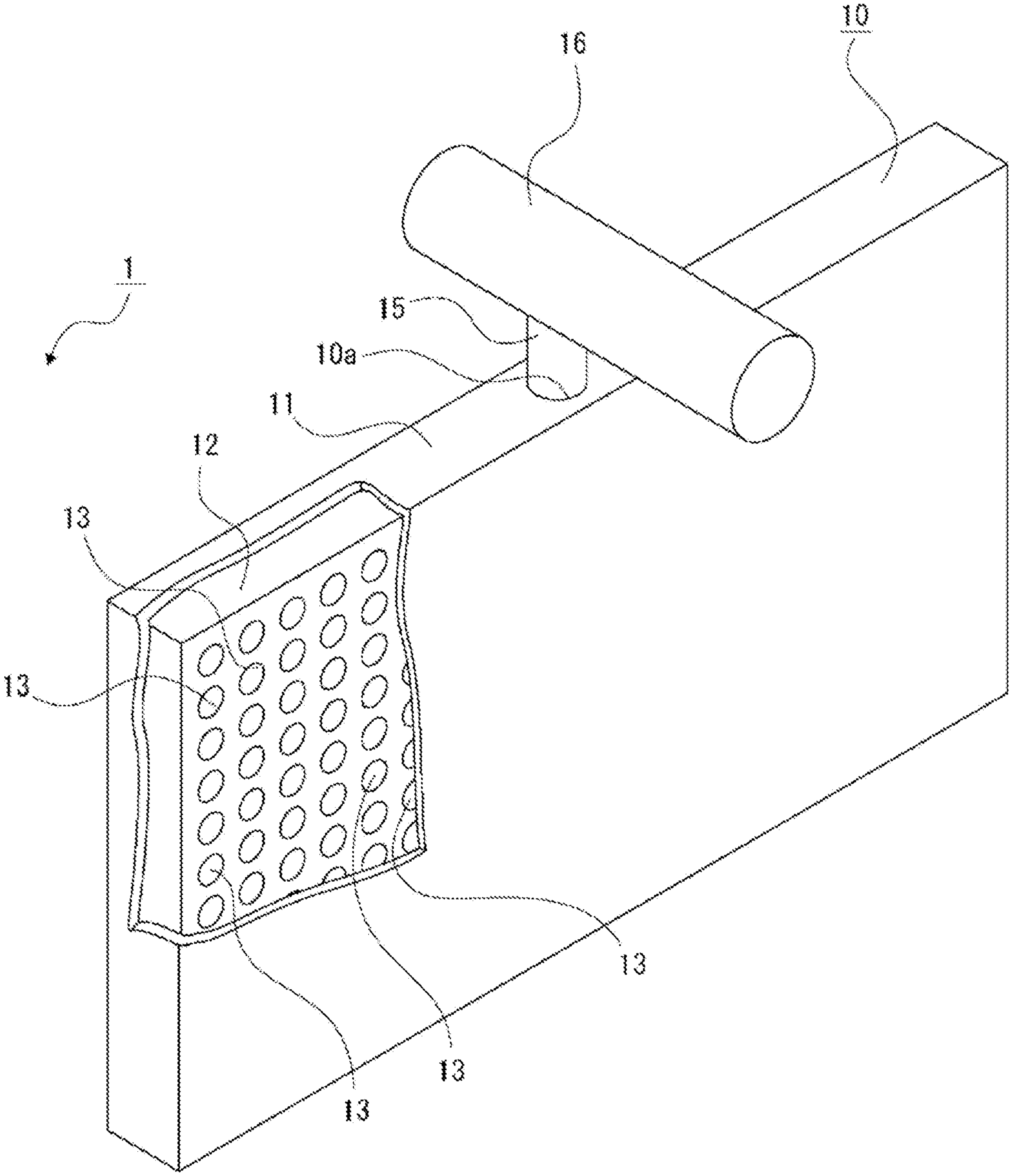
FIG. 2 is a perspective view illustrating a part of a partition in cross section.

A configuration example of the partition 10 will be described with reference to FIG. 2.

The partition 10 is composed of a case 11 having high sealing performance and a heat insulator 12 disposed inside the case 11.

The heat insulator 12 has a large number of pores 13, and the cooling solvent is held in the pores 13. The heat insulator 12 is formed of a porous ceramic, for example.

The pores 13 are formed so as to be arranged two dimensionally on a plane orthogonal to the thickness direction of the heat insulator 12, and have the same diameter. The diameter of the pores 13 is several millimeters (mm), for example.

Figure 3:
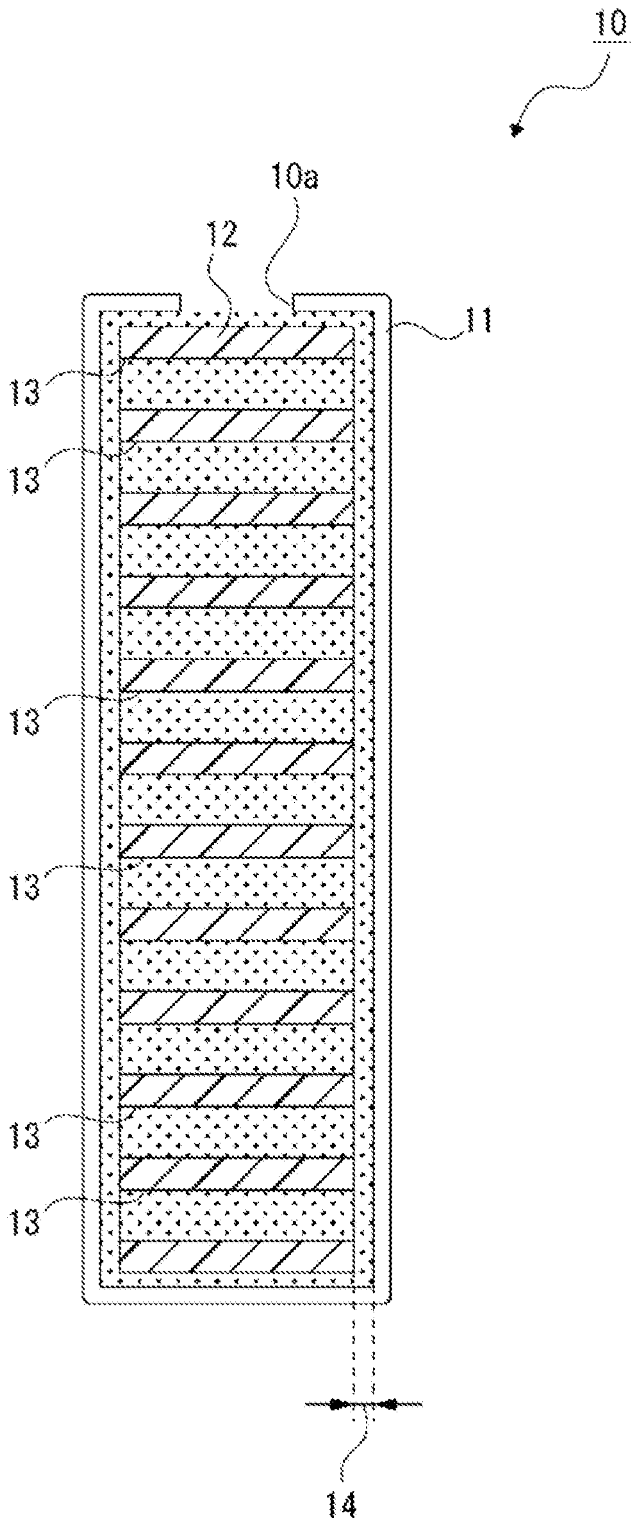
FIG. 3 is a sectional view of the partition.

As illustrated in FIG. 3, a gap 14 is provided between the heat insulator 12 and the case 11, and the cooling solvent can move between the pores 13 through the gap 14 as illustrated by a dotted area in the drawing. The width of the gap 14 is less than 1 mm, for example.

A discharge hole 10*a* is formed in the upper surface of the case 11 of the partition 10. The cooling solvent which has become a vaporized gas is discharged to the outside through the discharge hole 10*a*.

The vaporized gas generated by the vaporization of the cooling solvent in the pores 13 and the gap 14 passes through the gap 14, moves upward, and is then discharged to the outside of the partition 10 through the discharge hole 10*a*.

A protrusion (not illustrated) having substantially the same height as the length of the gap 14 may be provided on the surface of the heat insulator 12 facing the arrangement direction so that a part of the heat insulator 12 may be configured to be in contact with the inner surface of the case 11.

Since the heat insulator 12 is configured to be in contact with the inner surface of the case 11 via the protrusion, it is possible to prevent the case 11 from being deformed and damaged when a force is applied to the case 11 from the arrangement direction. In addition, it is possible to avoid the cooling solvent, which fills the inside, from flowing out of the case 11. Therefore, the heat exchange function between the battery cells 9 by the cooling solvent can be maintained.

The vehicle battery pack 1 has a configuration for discharging a vaporized gas generated by the vaporization of the cooling solvent, which fills the inside of the partition 10, for example.

For example, the vehicle battery pack 1 includes connection ducts 15, a coupling duct 16, a detection sensor 17, and a terminal 18.

Figure 4:
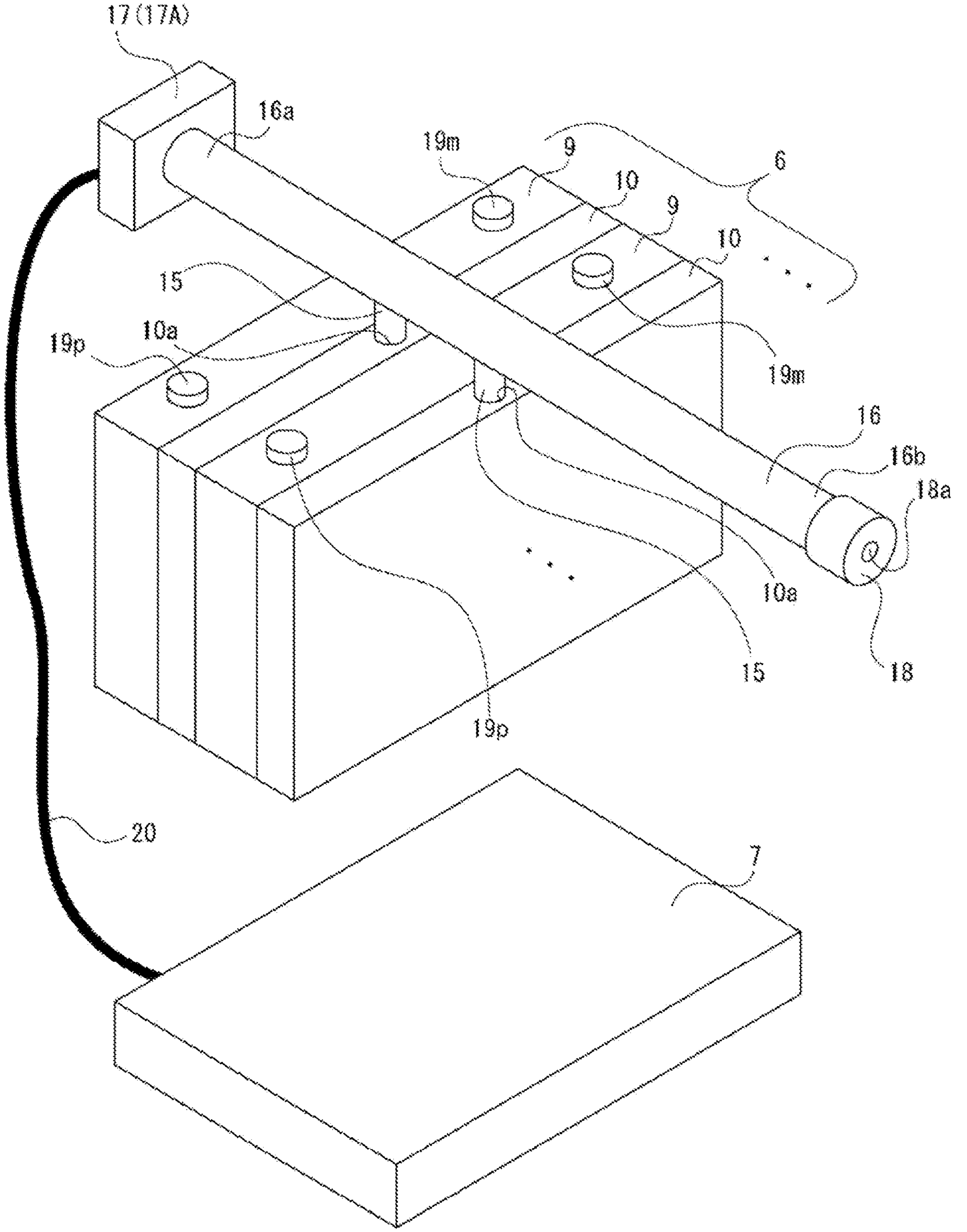
FIG. 4 is a perspective view illustrating a part of the vehicle battery pack.

FIG. 4 illustrates a configuration example of the battery ECU 7, the battery cells 9, the partitions 10, the connection ducts 15, the coupling duct 16, the detection sensor 17, and the terminal 18.

Note that FIG. 4 illustrates some of the battery cells 9 and the partitions 10 included in the battery module 6.

The battery cells 9 have positive terminals 19*p* and negative terminals 19*m* provided on the upper surfaces thereof. In FIG. 1, the positive terminals 19*p* and the negative terminals 19*m* are simply illustrated as "terminals 19" without being distinguished from each other.

Cables connected to the terminals 19 are omitted from the illustration in FIGS. 1 and 4.

The connection ducts 15 extending in the up-down direction and formed in a cylindrical shape are connected to the discharge holes 10*a* formed in an upper portion of the partitions 10.

The connection ducts 15 connected to the respective partitions 10 are connected to the coupling duct 16 to communicate with each other. That is, the vaporized gas generated by the vaporization of the cooling solvent in the respective partitions 10 flows into the coupling duct 16 via the connection ducts 15.

The coupling duct 16 is formed in a cylindrical shape extending in the arrangement direction. The detection sensor 17 is connected to a first end 16*a*, which is one end in the arrangement direction, and the terminal 18 is connected to a second end 16*b*, which is the other end.

The detection sensor 17 is a sensor for detecting the generation of a vaporized gas obtained by the vaporization of the cooling solvent in any of the partitions 10 connected to the coupling duct 16.

As the detection sensor 17, a sensor for detecting a substance contained in the cooling solvent is considered. For example, if the cooling solvent is a liquid containing a specific chemical substance, the sensor detects the chemical substance in a vaporized gas generated by the vaporization of the cooling solvent or a substance generated by a chemical reaction during vaporization. In addition, when the cooling solvent is water, a humidity sensor or the like may be used as the detection sensor 17. Furthermore, when the cooling solvent is an alcohol-based solvent, an alcohol sensor or the like may be used as the detection sensor 17.

As the detection sensor 17, a pressure sensor 17A capable of detecting an increase in pressure due to the generation of the vaporized gas may be adopted. In the example illustrated in FIG. 4, the pressure sensor 17A is used as the detection sensor 17.

The detection sensor 17 can communicate with the battery ECU 7 by being connected to the battery ECU 7 via a communication line 20. That is, the detection sensor 17 outputs a detected sensor value to the battery ECU 7, and the battery ECU 7 executes a process described later based on the input sensor value.

The terminal 18 is provided with a discharge hole 18*a* for discharging the vaporized gas to the outside in order to decompress the inside of the coupling duct 16. As a result, the pressure in the coupling duct 16 is prevented from becoming too high, and malfunction of the detection sensor 17, breakage of the coupling duct 16, and the like can be prevented.

Figure 5:
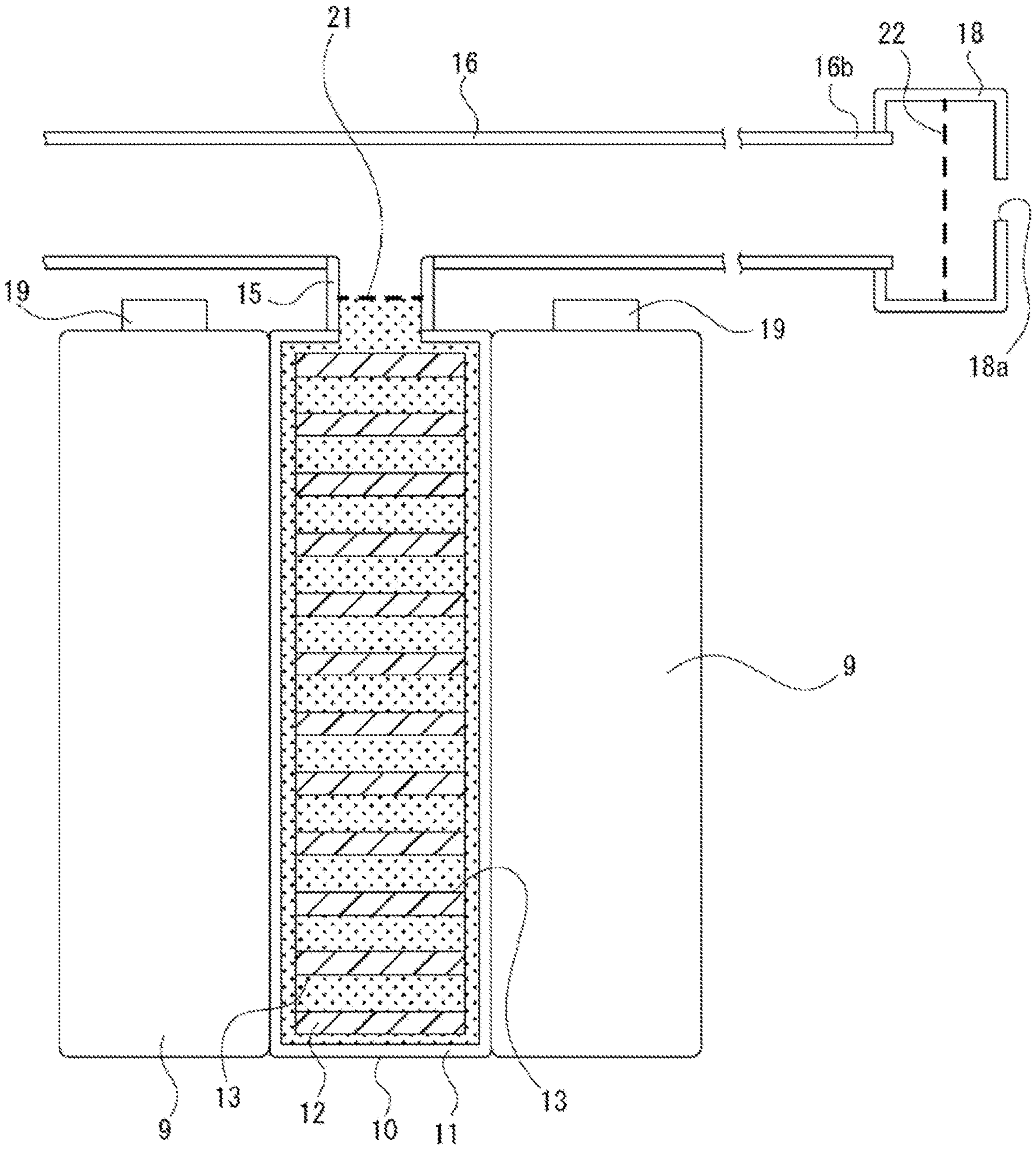
FIG. 5 is a diagram for describing a discharge path at the time of vaporization of a cooling solvent.

A valve mechanism is provided in each of the connection duct 15 and the terminal 18. This will be described in detail with reference to FIG. 5.

A vaporized gas release valve 21 (illustrated by a broken line) for releasing the vaporized gas generated inside the partition 10 to the coupling duct 16 is provided inside the connection duct 15.

The vaporized gas release valve 21 automatically opens and closes according to the pressure inside the partition 10. That is, when the pressure inside the partition 10 becomes higher than a predetermined threshold value due to the generation of the vaporized gas, the vaporized gas release valve 21 is brought into an open state, and the pressure inside the partition 10 is adjusted so as not to increase further.

A pressure reducing valve 22 (illustrated by a broken line) is provided inside the terminal 18. Similarly to the vaporized gas release valve 21, the pressure reducing valve 22 is brought into the open state at a predetermined timing when the pressure inside the coupling duct 16 increases, and the vaporized gas is released from the coupling duct 16.

As illustrated in FIG. 1, a discharge duct is coupled to the discharge hole 18*a* of the terminal 18, and the vaporized gas generated by the vaporization of the cooling solvent is discharged to the outside of the vehicle through the discharge duct.

Thus, the vaporized gas is prevented from being taken into the vehicle interior, and the occupant safety is improved.

The battery ECU 7 illustrated in FIG. 1 monitors the voltage, temperature, SOC (State Of Charge), SOH (State Of Health), and the like of each member so that appropriate power is supplied by the high-voltage battery cell 9 or the battery module 6.

In addition, in the present embodiment, the battery ECU 7 acquires a sensor value from the pressure sensor 17A as the detection sensor 17, and determines whether thermal runaway has occurred in the battery cell 9.

When the occurrence of thermal runaway in the battery cell 9 is detected by the battery ECU 7, the battery ECU 7 performs a process of electrically disconnecting the battery cell 9. In addition, a controller such as the battery ECU 7 or another ECU issues an evacuation instruction or the like to the occupants when thermal runaway is detected.

As illustrated in FIG. 1, the cooler 8 is disposed adjacent to a lower portion of the case unit 4, and cools the battery module 6 from below.

The cooling solvent such as water is circulated inside the cooler 8, and the cooling solvent is cooled by a chiller (not illustrated) or the like to maintain a cooling effect on the battery module 6.

2. Flowchart

The battery ECU 7 or another ECU (hereafter, simply referred to as a "controller") performs a process of detecting the occurrence of thermal runaway in the battery cell 9. The process executed by the controller will be described with reference to FIG. 6.

Figure 6:
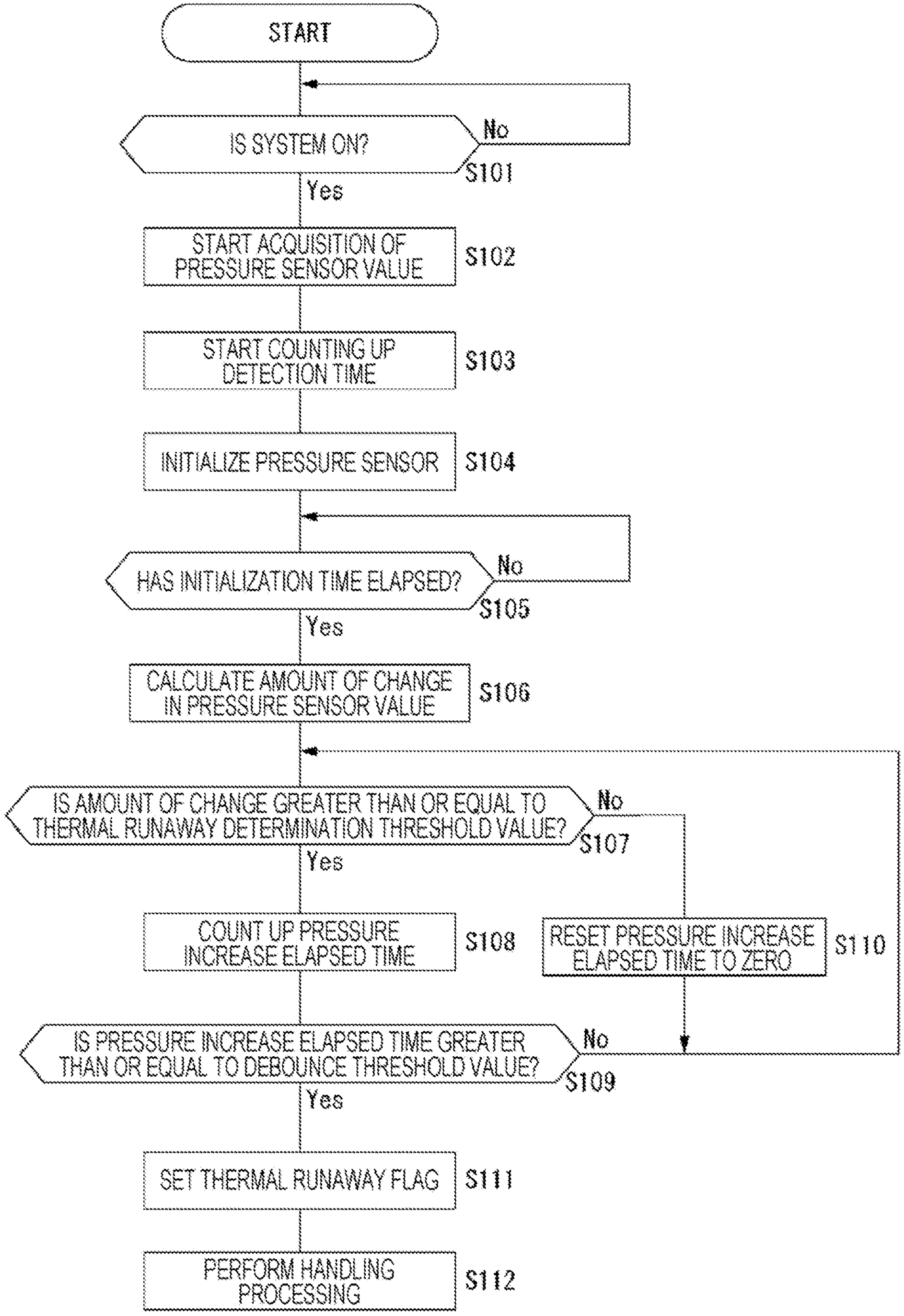
FIG. 6 is a flowchart of a process executed by a controller to detect occurrence of thermal runaway.

In step S101 in FIG. 6, the controller determines whether the system is in the ON state. The ON state of the system is processing of determining whether a control system of the vehicle is in an active state, and may be, for example, processing of determining whether the vehicle is in a state of capable of traveling.

If it is determined that the system is not in the ON state, the controller repeats the processing in step S101.

On the other hand, when it is determined that the system is in the ON state, the controller starts acquisition of the sensor value by starting sensing by the detection sensor 17 (hereafter, referred to as the pressure sensor 17A) in step S102.

In step S103, the controller starts counting up a detection time. The detection time herein is an elapsed time from the start of acquisition of a pressure sensor value by the pressure sensor 17A.

The controller starts initialization processing of the pressure sensor 17A in step S104, and determines whether an initialization time has elapsed by determining whether the detection time has reached the initialization time in the subsequent step S105.

The initialization time is a time taken to complete the initialization processing of the pressure sensor 17A started in step S104. That is, the controller waits until the initialization processing is completed in step S105.

In the initialization processing, it is checked whether the pressure sensor value acquired by the pressure sensor 17A is a normal value. Therefore, the initialization processing is performed after the start of acquisition of the pressure sensor value in step S102.

The controller calculates the amount of change in the pressure sensor value in step S106. The pressure sensor value is acquired at intervals of several hundred milliseconds or one second after step S103. In step S106, the controller calculates the amount of change by calculating the difference between the most recent value and the previous value of the pressure sensor value.

In step S107, the controller determines whether the calculated amount of change in the pressure sensor value is greater than or equal to a thermal runaway determination threshold value. When thermal runaway occurs, the pressure sensor value continues to increase for a while. The controller can detect an initial movement of the occurrence of thermal runaway by detecting an increase in the pressure sensor value.

The controller of this configuration does not determine whether the pressure sensor value is greater than or equal to the threshold value, but determines whether the amount of change in the pressure sensor value is greater than or equal to the threshold value. When the pressure sensor 17A malfunctions, there is a possibility that the pressure sensor 17A continues to output a predetermined sensor value. At this time, when a configuration in which it is determined that the pressure sensor value is greater than or equal to the threshold value is adopted, there is a possibility that the occurrence of thermal runaway is erroneously detected. On the other hand, according to this configuration in which it is determined that the amount of change in the pressure sensor value is the threshold value, it is possible to prevent the occurrence of thermal runaway from being erroneously detected.

When it is determined that the amount of change in the pressure sensor value is greater than or equal to the thermal runaway threshold value, the controller starts counting up a pressure increase elapsed time in step S108. The pressure increase elapsed time is an elapsed time from the occurrence of an increase in pressure.

In step S109, the controller determines whether the pressure increase elapsed time is greater than or equal to a debounce threshold value. The debounce threshold value is provided to prevent erroneous thermal runaway determination due to debounce that may occur when the amount of change in the pressure sensor value exceeds the thermal runaway determination threshold value for the first time, and is set to several seconds, for example.

That is, it is possible to prevent erroneous determination in the thermal runaway determination by confirming that the amount of change in the pressure sensor value continuously exceeds the thermal runaway determination threshold value for a certain period (for example, several seconds) based on the debounce threshold value.

When the pressure increase elapsed time is less than the debounce threshold value, the controller returns to the determination processing in step S107.

When it is determined in step S107 that the amount of change in the pressure sensor value is less than the thermal runaway determination threshold value, the controller resets the pressure increase elapsed time to zero in step S110, and returns to the processing in step S107.

If it is determined in step S109 that the pressure increase elapsed time is greater than or equal to the debounce threshold value, that is, if the increase in pressure greater than or equal to a certain level is continuously detected, the controller sets a thermal runaway flag to "1" in step S111. That is, the controller detects the occurrence of thermal runaway in step S111.

In step S112, the controller performs processing to handle the occurrence of thermal runaway. In the handling process, for example, electrical disconnection processing for each battery cell 9 in the battery module 6 is performed, and an evacuation instruction or the like is further issued to the occupants.

The evacuation instruction to the occupants may be issued via, for example, a monitor or the like disposed at a position visible to a driver, or may be given by a voice output.

3. Modification Example

A modification example of the above-described vehicle battery pack 1 will be described.

Figure 7:
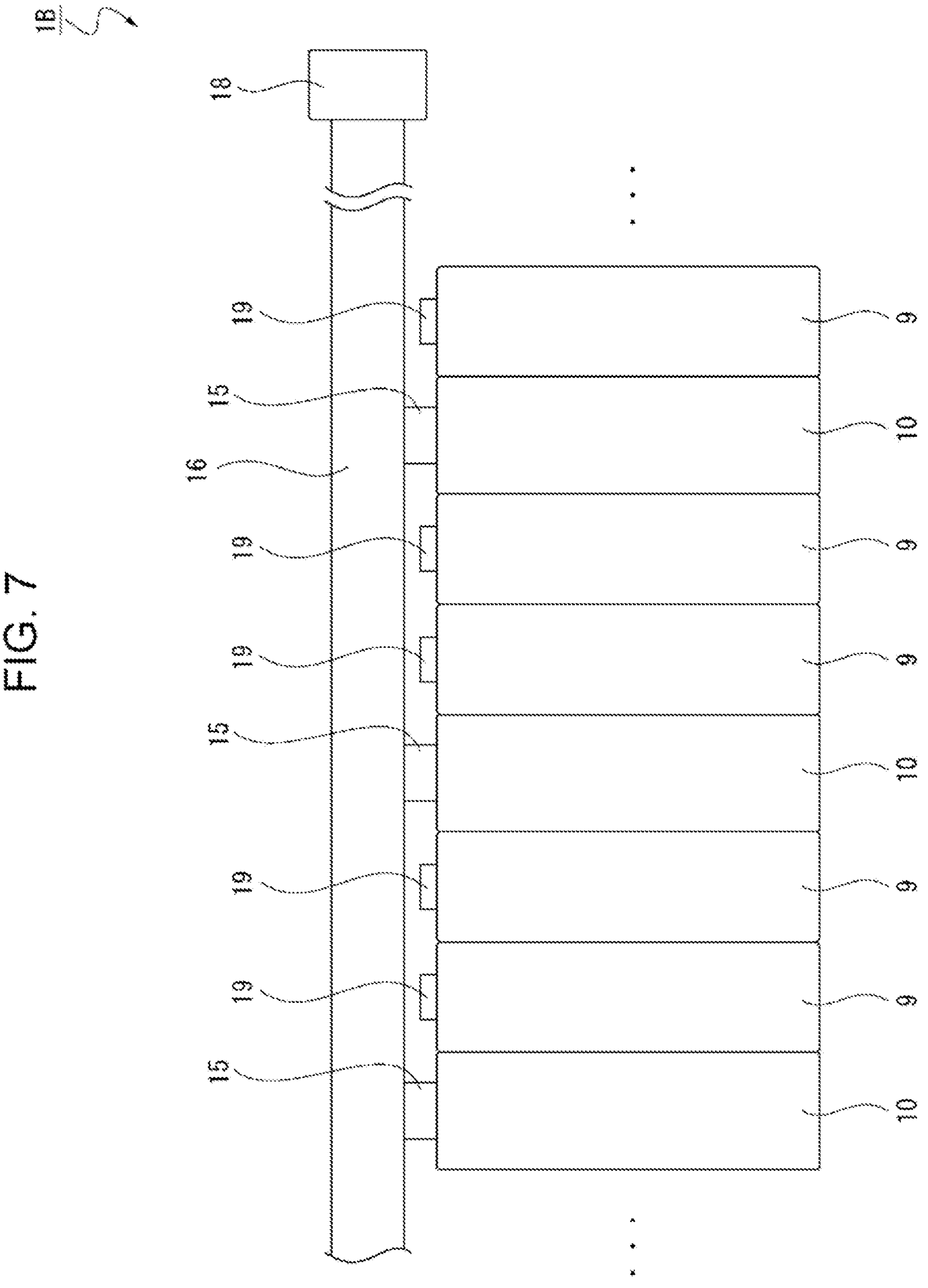
FIG. 7 is an explanatory view of a configuration example of a modification example of the vehicle battery pack.

As illustrated in FIG. 7, a vehicle battery pack 1B may be configured to have a battery module 6B in which the number of partitions 10 is smaller than that in the above-described example.

For example, the battery cells 9 included in the battery module 6B are disposed adjacent to one side in the arrangement direction, and the partitions 10 are disposed adjacent to the other side in the arrangement direction. In other words, one partition 10 is provided adjacent to each pair of two battery cells 9.

As a result, all the battery cells 9 are adjacent to the partitions 10, heat is efficiently transferred between the battery cells 9, and the size of the battery module 6B can be reduced by reducing the number of the partitions 10.

Therefore, the length of the vehicle battery pack 1B in the arrangement direction can be reduced, and the space for disposing the vehicle battery pack 1B can be reduced. In addition, it is possible to improve the degree of disposing freedom of the vehicle battery pack 1B. Furthermore, it is possible to improve the degree of disposing freedom of the vehicle equipment other than the vehicle battery pack 1B, and to improve the degree of freedom of the shape of the vehicle equipment.

In the vehicle battery pack 1 described above, an example in which the single detection sensor 17 is provided on the first end 16*a* of the coupling duct 16 has been described. However, the detection sensor 17 may be provided for each of the battery cells 9.

This makes it possible to identify the battery cell 9 in which thermal runaway has occurred. Therefore, the number of battery cells 9 to be subjected to electrical disconnection processing can be reduced, and it becomes easy to secure the minimum power for moving the vehicle to a safe place.

The pressure reducing valve 22 disposed in the terminal 18 may be automatically opened and closed when the internal pressure of the coupling duct 16 reaches a predetermined level, or may be opened and closed under the control of the battery ECU 7 or the like. For example, the battery ECU 7 controls the pressure reducing valve 22 to the open state when the sensor value of the pressure sensor 17A is greater than or equal to a predetermined threshold value, and controls the pressure reducing valve 22 to the closed state when the sensor value is less than the predetermined threshold value.

In a case where the pressure reducing valve 22 is configured to open and close naturally, variations occur in the timing of opening due to manufacturing errors of the pressure reducing valve 22.

On the other hand, in a case where the control is performed in accordance with the sensor value of the pressure sensor 17A, it is possible to reduce variations in the opening timing by suppressing detection errors of the pressure sensor 17A, and it is possible to suppress malfunctions of the pressure sensor 17A or the like.

The vehicle battery pack 1 may adopt a liquid cooling system in which the cooler 8 is disposed below the case unit 4, but may adopt an air cooling system in which the cooler 8 disposed below the case unit 4 is unnecessary. Thus, the size of the vehicle battery pack 1 can be reduced.

The above-described examples may be combined in any manner.

4. Supplementary Note

As described in the above examples, the vehicle battery pack 1 (1B) to be mounted on an electric vehicle configured to drive wheels by the power of an electric motor, such as a hybrid automobile or an electric automobile, includes the battery module 6 (6B), the vaporized gas release valves 21, the coupling duct 16, and the detection sensor 17 (for example, the pressure sensor 17A). The battery module 6 includes the battery cells 9 and the partitions 10. The partitions 10 are arranged between the battery cells 9 in the arrangement direction of the battery cells 9 (for example, in the vehicle front-rear direction), include the heat insulator 12, and are filled with the cooling solvent. The vaporized gas release valves 21 operate by an increase in pressure associated with the vaporization of the cooling solvent in the partitions 10 and release the vaporized gas generated by the vaporization from the partitions 10. The coupling duct 16 couples the vaporized gas release valves 21. The detection sensor 17 detects a release of the vaporized gas through the vaporized gas release valves 21.

Thus, while the cooling solvent is present as a liquid in the partition 10, heat is efficiently transferred between two adjacent battery cells 9 via the partition 10. In addition, when thermal runaway occurs in the battery cell 9, the cooling solvent is vaporized due to an increase in the temperature of the battery cell 9 and is released to the outside from the partition 10. As a result, the two battery cells 9 are adjacent to each other with the heat insulator 12 and the vaporized gas interposed therebetween, thereby significantly inhibiting the thermal conductivity between the battery cells 9.

In addition, by measuring the pressure in the coupling duct 16 based on the sensor value of the detection sensor 17 such as the pressure sensor 17A, the generation of the vaporized gas generated by the vaporization of the cooling solvent can be detected.

Therefore, it is possible to improve the cooling performance of the battery cells 9 when thermal runaway does not occur and also suppress the spread of fire to the surrounding battery cells 9 when thermal runaway occurs. When the controller detects the occurrence of thermal runaway in the battery cell 9, it is possible to quickly provide a notification or the like to the driver. Therefore, it is possible to secure a time for driving the vehicle to a safe zone and stopping the vehicle, and to improve the occupant safety.

Since the battery cells 9 are connected by the coupling duct 16, the single detection sensor 17 for the battery module 6 may suffice. Thus, the number of components can be reduced.

The vehicle battery pack 1 (1B) may include the pressure reducing valve 22 for reducing the internal pressure of the coupling duct 16.

When the cooling solvent is vaporized by heat generated by thermal runaway of the battery cell 9 to cause an increase in pressure, the pressure reducing valve 22 operates to reduce the pressure in the partition 10.

The pressure at which the pressure reducing valve 22 is brought into the open state is set to be higher than the pressure at which the thermal runaway flag is set to "1". This prevents the pressure reducing valve 22 from being opened to reduce the pressure in the coupling duct 16 before thermal runaway is detected.

Furthermore, the heat insulator 12 in the vehicle battery pack 1 (1B) may have the pores 13 in which the cooling solvent is held.

For example, the large number of pores 13 are provided in the partition 10 formed in a flat cubic shape over the plane orthogonal to the arrangement direction, and the axial direction of the large number of pores 13 is set to the arrangement direction.

Therefore, since the cooling solvent filling the pores 13 is adjacent to the two battery cells 9 via the case 11, the thermal conductivity is improved. In addition, in the configuration in which the heat insulator 12 provided with the large number of pores 13 is adopted, the strength of the partition 10 is improved and the partition 10 is prevented from being deformed due to a force applied from the outside, compared to a configuration in which the heat insulator 12 is not disposed and a hollow internal space is filled with the cooling solvent. In addition, the partition 10 is strongly pressed against the battery cells 9 in the arrangement direction, so that the efficiency of heat exchange between the cooling solvent and the battery cells 9 is improved. Therefore, it is preferable to dispose the heat insulator 12 in the internal space of the partition 10 also in order to prevent the partition 10 from being deformed due to the pressing of the partition 10 against the battery cell 9.

Note that it is also possible to improve the resistance to deformation due to the pressing in the arrangement direction of the partitions 10 by forming the case 11 of the partitions 10 to be sturdy, but this leads to an increase in the weight of the partitions 10. Since the partition 10 has the heat insulator 12, an increase in the weight of the partition 10 can be avoided.

In addition, the pores 13 in the vehicle battery pack 1 (1B) may be cylindrical holes whose axial direction is the arrangement direction (for example, the vehicle front-rear direction).

Since the pores 13 have a cylindrical shape, convection in the pores 13 is smoothly circulated, and heat exchange between the battery cells 9 and the cooling solvent can be efficiently performed. Therefore, a high cooling performance can be exhibited.

Furthermore, the detection sensor 17 in the vehicle battery pack 1 (1B) may be the pressure sensor 17A.

By acquiring the sensor value from the pressure sensor 17A, the controller (the battery ECU 7) can detect the generation of the vaporized gas generated by the vaporization of the cooling solvent.

REFERENCE SIGNS LIST

1, 1B vehicle battery pack
6, 6B battery module
9 battery cell
10 partition
12 heat insulator
13 pore
16 coupling duct
17 detection sensor
17A pressure sensor
21 vaporized gas release valve
22 pressure reducing valve

The invention claimed is:

1. A vehicle battery pack comprising:

a battery module including battery cells and partitions arranged between the battery cells in an arrangement direction of the battery cells, the partitions including a heat insulator and being filled with a cooling solvent;

vaporized gas release valves configured to operate by an increase in pressure associated with vaporization of the cooling solvent in the partitions and release of vaporized gas generated by the vaporization from the partitions;

a coupling duct coupling the vaporized gas release valves; and a detection sensor configured to detect a release of the vaporized gas through the vaporized gas release valves, wherein the heat insulator has pores holding the cooling solvent, and wherein the partitions each comprise a case having opposing side walls, and wherein interior side surfaces of the opposing side walls define cooling solvent gaps relative to respective coplanar exterior side walls of the heat insulator, and wherein the cooling solvent in the pores is in fluid communication with the cooling solvent gaps across the heat insulator.

2. The vehicle battery pack according to claim 1, comprising a pressure reducing valve configured to reduce a pressure in the coupling duct.

3. A vehicle battery pack comprising:

a battery module including battery cells and partitions arranged between the battery cells in an arrangement direction of the battery cells, the partitions including a heat insulator and being filled with a cooling solvent;

vaporized gas release valves configured to operate by an increase in pressure associated with vaporization of the cooling solvent in the partitions and release of vaporized gas generated by the vaporization from the partitions;

a coupling duct coupling the vaporized gas release valves; and a detection sensor configured to detect a release of the vaporized gas through the vaporized gas release valves, wherein the heat insulator has pores holding the cooling solvent, and wherein the pores are cylindrical holes whose axial direction is the arrangement direction.

4. The vehicle battery pack according to claim 1, wherein the detection sensor is a pressure sensor.

5. The vehicle battery pack according to claim 2, wherein the detection sensor is a pressure sensor.

6. The vehicle battery pack according to claim 3, wherein the detection sensor is a pressure sensor.

7. The vehicle battery pack according to claim 3, wherein the cylindrical holes are through-holes extending through the heat insulator.

8. The vehicle battery pack according to claim 3, wherein the heat insulator is formed of a ceramic material.

9. The vehicle battery pack according to claim 3, wherein the partitions each comprise a case having opposing side walls and wherein interior side surfaces of the opposing side walls define cooling solvent gaps relative to respective coplanar exterior side walls of the heat insulator, and wherein the cooling solvent gaps are in fluid communication with the cooling solvent in the pores through the heat insulator.

10. The vehicle battery pack according to claim 9, wherein the opposing side walls of the case comprise external surfaces that are in direct thermal conduction contact with a pair of sandwiching batteries.

11. The vehicle battery pack according to claim 9, wherein the case is a sturdy case.

12. The vehicle battery pack according to claim 1, wherein the heat insulator is formed of a ceramic material.

13. The vehicle battery pack according to claim 1, wherein the pores are cylindrical holes whose axial direction is the arrangement direction.

14. The vehicle battery pack according to claim 13, wherein the cylindrical holes are through-holes extending through the heat insulator.

15. The vehicle battery pack according to claim 1, wherein the external surfaces of the case are in direct thermal conduction contact with a pair of sandwiching batteries.

16. The vehicle battery pack according to claim 1, wherein the case is a sturdy case.

17. The vehicle battery pack according to claim 3, wherein the heat insulator is formed of a ceramic material, and the cylindrical holes are through-holes extending through the ceramic material with central axes extending in the arrangement direction.

* * * * *